April 10, 1956  S. S. PRENTISS  2,741,085
SAFETY DEVICE, INCLUDING FUSIBLE MEMBER
FOR ROCKET ENGINE STARTING CONTROL
Filed May 12, 1952  3 Sheets-Sheet 2
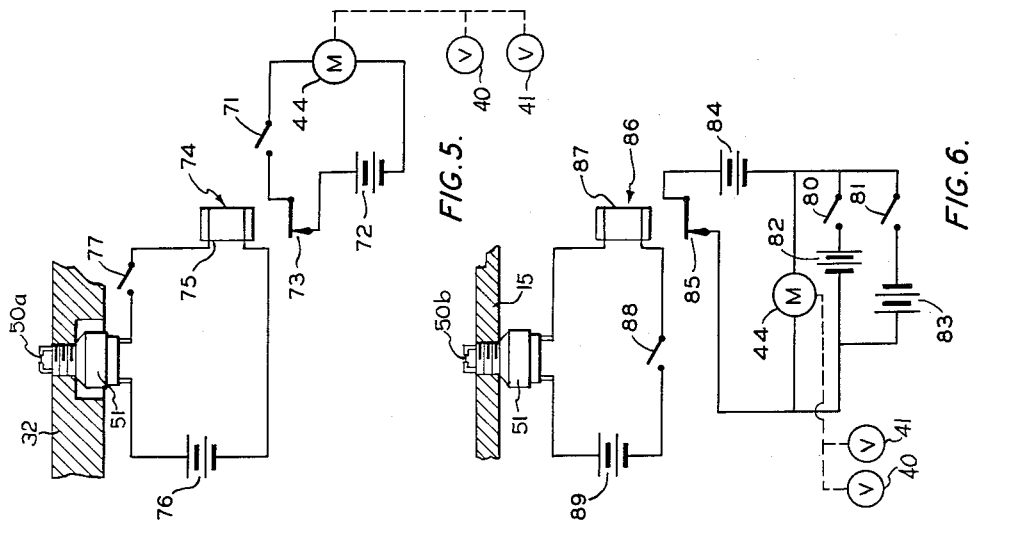
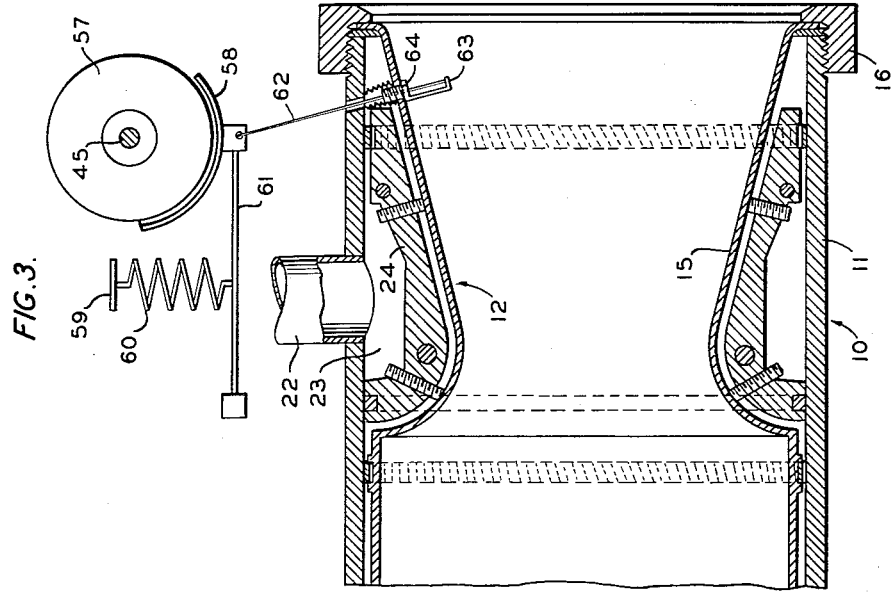
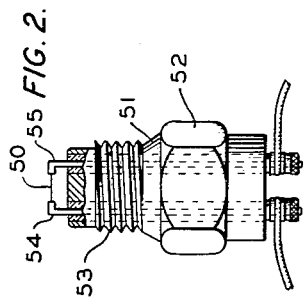
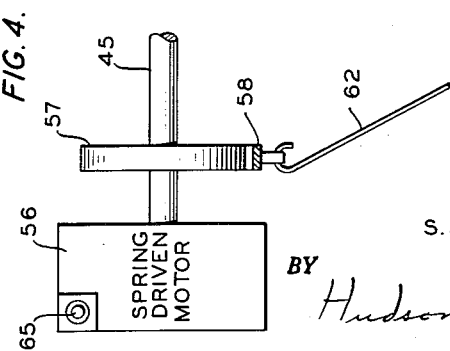
INVENTOR.
S. S. PRENTISS
BY
Hudson & Young
ATTORNEYS April 10, 1956

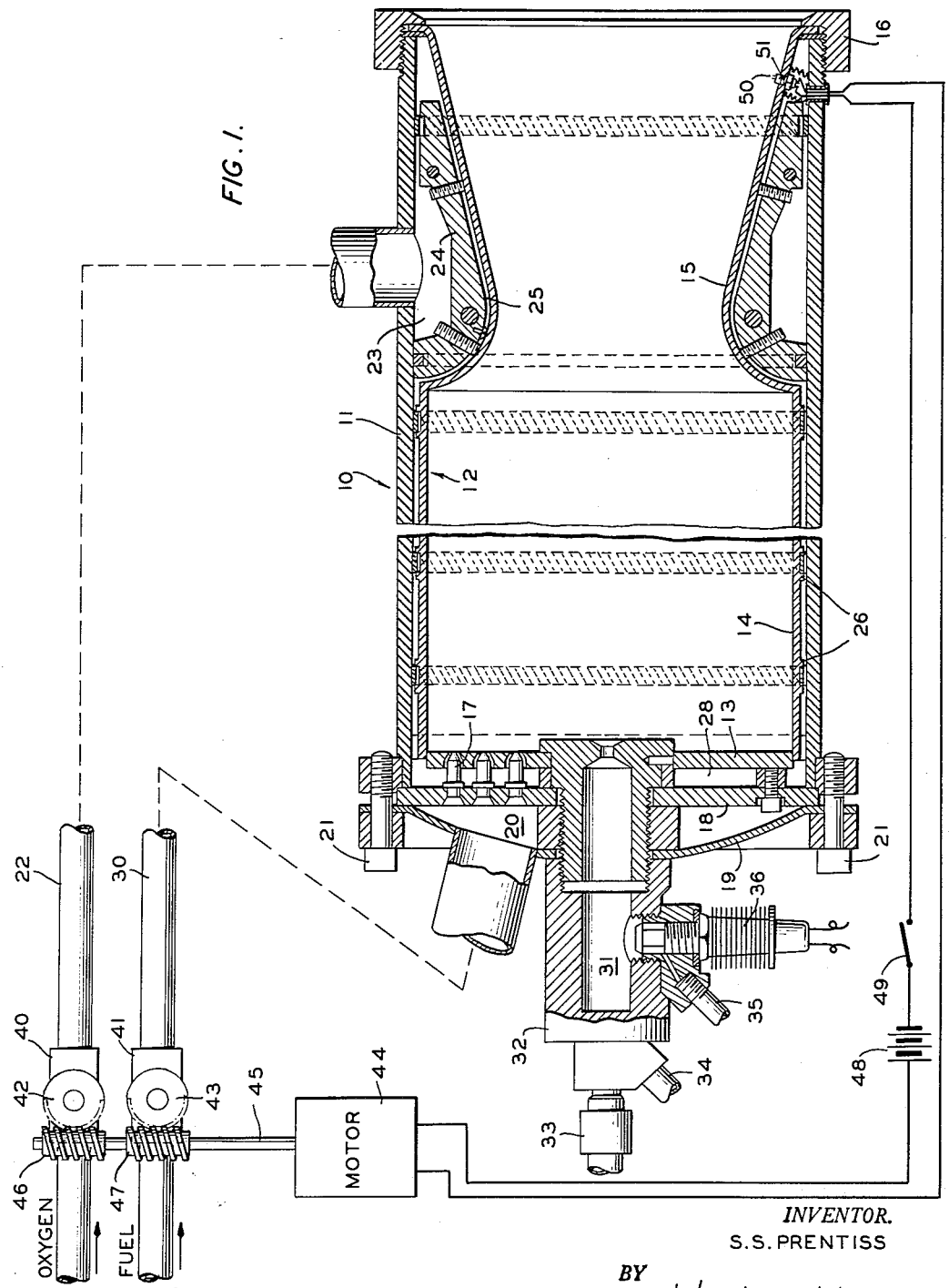

S. S. PRENTISS 2,741,085

SAFETY DEVICE, INCLUDING FUSIBLE MEMBER
FOR ROCKET ENGINE STARTING CONTROL

Filed May 12, 1952

INVENTOR.
S. S. PRENTISS

BY *Hudson + Young*

ATTORNEYS

United States Patent Office 2,741,085
Patented Apr. 10, 1956

2,741,085

SAFETY DEVICE, INCLUDING FUSIBLE MEMBER FOR ROCKET ENGINE STARTING CONTROL

Spencer S. Prentiss, Bartlesville, Okla., assignor to Phillips Petroleum Company, a corporation of Delaware Application May 12, 1952, Serial No. 287,290

8 Claims. (Cl. 60—39.09)

This invention relates to rocket engines. In one specific aspect, it relates to mechanism for properly controlling the supply of fuel or oxidant or both to a rocket engine.

Heretofore, considerable difficulties have been experienced with rocket engines resulting from delayed ignition in the combustion chamber. This results in an accumulation of fuel within the chamber which can cause an explosion and resultant destruction of the engine or of an aircraft upon which it is mounted.

In accordance with this invention, the destructive effects of delayed ignition are avoided by interrupting or reducing the supply of fuel, oxidant or both to the combustion chamber when combustion of the main fuel charge does not take place within a proper period of time.

It is an object of the invention to provide improved mechanism for controlling the supply of fuel or oxidant or both to a rocket engine.

It is a still further object to avoid damage to or destruction of the engine resulting from delayed combustion.

Various other objects, advantages and features of the invention will become apparent from the following detailed description taken in conjunction with the accompanying drawings, in which:

Figure 1 is a schematic diagram illustrating the application of the mechanism of this invention to a rocket combustion chamber;

Figure 2 is a front elevational view, partly in section, of a fusible link supporting device;

Figure 3 is a diagrammatic view illustrating a modification of the invention;

Figure 4 is a side view of the braking wheel of Figure 3 and illustrates the motor drive for said braking wheel. The same parts illustrated are identified by the same numerals.

Figure 5 is a schematic circuit diagram of a further modification of the invention;

Figure 6 is a circuit diagram of a still further modification of the invention;

Figure 7:
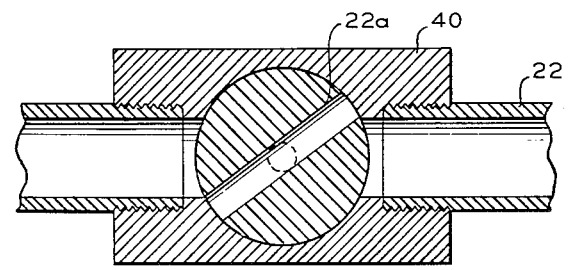
Figure 7 is a sectional view of a valve having a long full flow period.

Referring now to the drawings in detail and particularly to Figure 1, I have illustrated a combustion chamber 10 of a rocket engine, this chamber including a generally cylindrical housing 11 having a refractory shell 12 mounted concentrically therewithin, the shell incorporating an end plate 13 at the upstream end thereof, a cylindrical portion 14, and a tapered throat or venturi 15. At the downstream end, the shell is secured to the housing by a threaded annular ring 16. The upstream portion 13 of the casing receives the tips of a series of jets 17. These jets are mounted on a plate 18 which, together with an end cap 19, defines a fuel-receiving chamber 20, the plate 18 and cap 19 being secured to the housing 11 by bolts 21.

An oxidant, such as oxygen, is admitted through a conduit 22 to a chamber 23 defined by the housing and a generally annular insert 24 which is complementary with the tapered throat 15 of the shell 12. The oxidant flows downstream through the chamber 23 and thence upstream through a region 25 constituting the interspace between the shell and housing, this interspace being provided with several sets 26 of curved vanes which impart a swirling movement to the oxidant material. From the interspace 25, the oxidant passes to a chamber 28 defined by the housing and the plates 13, 18 whence it passes through the spaces between the tips of the jets 17 and the plate 13 to the combustion chamber. It will be understood that the oxidant material is preheated during its passage through interspace 25 by contact with the hot refractory shell 12.

Fuel is admitted to the combustion chamber through a conduit 30 which communicates with chamber 20, the fuel passing into the combustion chamber through the jets 17.

The engine also includes, in some modifications thereof, a precombustion chamber 31 defined by a tubular member 32 communicating with the upstream part of the combustion chamber through the plate 13. The precombustion chamber can be supplied with an oxidant material, such as oxygen, through a line 33, a fuel, such as gasoline, through a line 34 and an inert or diluent gas can be introduced through a line 35 in such fashion that the diluent gas cools and protects an ignition device 36 secured to the tubular member 32 and extending into the chamber for the purpose of igniting the fuel in the precombustion chamber.

In accordance with the invention, the supply of oxidant fed through conduit 22 is regulated by a valve 40 and the supply of fuel through conduit 30 is regulated by a valve 41. The valves 40, 41 are so constructed that a unidirectional movement, such as a clockwise rotation, Figure 1, of gear wheels 42 and 43, respectively, forming a part of the valves 40 and 41, causes the valves first to open and then to close, a stop being provided to terminate the unidirectional movement at the closed position. The valves are operatively connected to a motor 44, as by a shaft 45 and worm gears 46, 47 cooperating respectively with the gear wheels 42 and 43. In Figure 1, the motor is electrically driven, and its energizing circuit includes a battery or other current source 48, a switch 49, and a fusible element 50, Figures 1 and 2, mounted upon a plug 51 within the combustion chamber 10.

It will be noted that the plug 51 includes a generally cylindrical body 52, Figure 2, provided with threads 53 by which the plug can be threaded into the tapered throat 15 at the downstream end of the combustion chamber. Mounted within the plug are two parallel conductors 54, 55 which carry a fusible wire conductor 50 suitably secured thereto and supported between them.

It will be noted that the fusible conductor 50, switch 49 and the current source 48 are all connected in series with the motor 44. Assuming that the valves 40, 41 are initially in closed position, energization of motor 44 by closure of switch 49 causes the valves to move toward open position. If a combustion reaction is initiated, either spontaneously or by action of the ignition device 36, between the fuel and oxidant thereby supplied to the combustion chamber, the fusible conductor 50 is melted and the motor circuit is broken as the valves reach a fully open position. Thereafter, the supply of fuel and oxidant to the combustion chamber continues in the usual manner until the end of the combustion period or until the valves are manually actuated to stop the flow of fuel and oxidant. However, should a combustion reaction not be initiated, the fusible conductor will not be melted and operation of the motor 44 will continue thereby moving the valves beyond the fully open position to closed position. As a result, this supply of fuel and oxidant to the combustion chamber will be cut off and explosive conditions cannot develop therein. Suitable fuels for obtaining spontaneous combustion are, for example, a mixture of N-monoethylaniline and analine, or a mixture of terpenes and strong nitric acid.

In a modification of Figures 3 and 4, parts similar to those already described are indicated by like reference numerals. In this modification, the electrical motor is replaced by a spring-driven motor 56 secured to the shaft 45, Figure 1, which is operatively connected to the valves 40 and 41. Shaft 45 also carries a friction wheel 57 with which cooperates a braking member 58. The braking member 58 is urged into engagement with the friction wheel 57 by a spring 60 secured to a support 59 to an arm 61 pivotally connected to the braking member 58. Braking member 58 has secured thereto a fusible wire 62 which extends through housing 11 and the tapered throat 15 of shell 12 into the combustion chamber. The end of the wire 62 which protrudes into the combustion chamber is secured to a support 63 forming a part of a screw threaded plug 64 which is threaded to the shell 12.

The operation of the modification of Figures 3 and 4 is substantially the same as the operation of Figures 1 and 2. When operation of the engine is to be initiated, a control button 65 on the motor 56 is depressed with the result that rotation of shaft 45 is initiated, thereby moving the valves 40, 41, Figure 1, toward open position. If combustion occurs between the fuel and oxidant thereby admitted to the combustion chamber, fusible wire 62 is melted, with the result that braking member 58 is urged into engagement with friction wheel 57 by the spring 60. As a result, the rotation of shaft 45 is stopped when the valves reach their fully open position, it being understood that the time required for the valves to be thereby moved in open position is equal to the time required for the combustion reaction to be initiated and the fusible member to be melted. In the event that the combustion reaction does not occur, the fusible wire 62 remains intact so that braking member 58 remains out of engagement with friction wheel 57. As a result, rotation of shaft 45 continues until the valves 40, 41 are again moved to closed position, thereby stopping the flow of oxidant and fuel before a dangerous condition can arise in the rocket engine.

Figure 8:
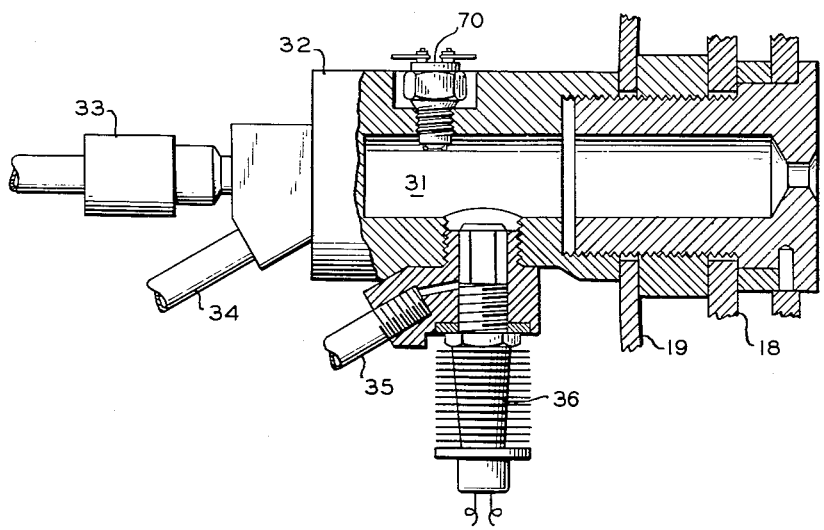
Figure 8 is a sectional view of the precombustion chamber of the rocket engine of Figure 1 showing an optional location of the safety control element.

In the modification of Figure 5, a plug 51, such as shown in Figure 2, is mounted in the precombustion chamber 31 of the engine of Figure 1 at the location indicated in Figure 8 by plug 70. In this modification of Figure 5, the valves 40 and 41 of Figure 1 are so constructed that they move to open position from closed position and remain open responsive to the operation of motor 44 which is indicated in both Figure 5 and Figure 1. That is, the valve is constructed with a means for stopping it in the fully open position. The motor 44 is connected in series with a switch 71, a battery or other current source 72, and a set of normally closed contacts 73 of a relay 74. The operating winding 75 of relay 74 is connected in series with a battery 76, the fusible element 50a (same as fusible element 50 of plug 51 as shown in Figure 2), and a switch 77. During the starting period, the relay operating circuit is closed by closing switch 77 with the result that the circuit of the motor is broken at contact 73. Switch 71 is then closed. When fuel and oxidant are fed to the precombustion chamber 31, and a combustion reaction is initiated therein, the fusible conductor 50a melts and the operating circuit of relay 74 is broken. As a result, motor 44 is energized to open valves 40 and 41, Figure 1, thereby admitting fuel and oxidant to the main combustion chamber through the conduits 22 and 30. Thus, until a combustion reaction is initiated in the chamber 31, the fusible conductor 50a remains intact and relay 74 remains energized so that no fuel nor oxidant can be supplied to the main combustion chamber.

In the modification of Figure 6, the valves 40 and 41 are also moved from a fully closed to a fully open position responsive to actuation of a reversible motor 44. The fusible conductor 50b, is mounted at the position shown by Figure 1 in the tapered throat of the combustion chamber. In this embodiment switch 88 remains closed throughout the operation. With switch 88 closed, the operating winding 87 of relay 86, which is in series with switch 88, current source 89 and fusible member 50b, holds normally closed contactor 85 in the open position. Switches 80 and 81 are open at the beginning of the operation. Motor 44 is wired to move valves 40 and 41 in one direction (forward) when either contactor 85 or switch 80 is closed. That is sources 84 and 82 are of the same polarity. Source 83 has the opposite polarity and when switch 81 is closed completing the circuit through source 83 to motor 44, said motor will turn in the opposite direction reversing the direction of the valves 40 and 41. When the rocket engine is to be started, switch 80 is closed for a period sufficiently long to partially open valves 40 and 41. Should the valve be opened too far, switch 81 is closed to adjust the fuel flow to the desired level. When this fuel is ignited and a combustion reaction takes place in the combustion chamber, the fusible conductor 50b is melted and the operating circuit of relay 86 is broken. As a result contactor 85 is allowed to close completing the circuit from source 84 to motor 44 which in turn moves valves 40 and 41 to the fully open position at which time said valves are stopped such as by running out of gears on the gear wheel or engaging other suitable stopping means.

Figure 7 shows one type of valve which has a relatively long fully open position compared to the opening and closing positions. That is the conduits 22 on either side of the valve 22a are large so that full flow is maintained from the time 22a is aligned with 22 until the valve makes the full pass to the closed position. As an alternative, the passageway 22a can be large in comparison with the conduits 22. Other types of valves having a comparatively long fully open position can be used as will be obvious to those skilled in the art. Most fuels will ignite almost instantaneous and the fusible member will melt very soon after the valve reaches the fully open position and by the proper selection of valve size, motor speed, gear ratio, etc., the valve will close by the time the fuel reaches the tolerable limits of the chamber should the fuel fail to ignite.

While the invention has been described in connection with present, preferred embodiments thereof, it is to be understood that this description is illustrative only, and is not intended to limit the invention.

I claim:

1. In a rocket engine comprising, in combination, a combustion chamber, a conduit communicating with said chamber to supply an oxidant thereto, a conduit communicating with said chamber to supply fuel thereto, a valve in each of said conduits, said valves being constructed and arranged to open and then close during a unidirectional adjustment thereof, a motor operatively coupled to both valves, a fusible member in said combustion chamber, means for starting said motor to initiate said unidirectional valve movement, and means controlled by said fusible member to interrupt the operation of said motor responsive to the breakage of said fusible member caused by combustion in said chamber.

2. A rocket engine comprising, in combination, a generally cylindrical housing, a shell of refractory material defining a combustion chamber concentric with and mounted inside said housing in a spaced relation to said housing, a conduit communicating with the downstream region of the interspace between said housing and said shell to admit an oxidizer material thereto, a series of jets disposed at the upstream end of said shell, plate members defining a first chamber upstream of said jets and a second chamber communicating with said interspace and positioned immediately upstream of said shell, a conduit communicating with said first chamber to admit fuel thereto, whereby fuel passing into said chamber enters the combustion chamber through said jets and draws oxidizer into the combustion chamber through regions surrounding and immediately adjacent said jets, a valve in each of said conduits, said valve being of the type which opens and then closes responsive to unidirectional movement thereof, an electric motor operatively connected to said valve to effect such unidirectional movement, a fusible conductor mounted within said combustion chamber, a current source, a switch, and leads connecting said fusible conductor, said current source and said switch in series with said motor.

3. A rocket engine comprising, in combination, a generally cylindrical housing, a shell of refractory material defining a combustion chamber concentric with and mounted inside said housing in spaced relation to said housing, a conduit communicating with the downstream region of the interspace between said housing and said shell to admit an oxidizer material thereto, a series of jets disposed at the upstream end of said shell, plate members defining a first chamber upstream of said jets and a second chamber communicating wtih said interspace and positioned immediately upstream of said shell, a conduit communicating with said first chamber to admit fuel thereto, whereby fuel passing into said chamber enters the combustion chamber through said jets and draws oxidizer into the combustion chamber through regions surrounding and immediately adjacent said jets, a valve in each of said conduits of the type which opens and then closes responsive to an unidirectional movement thereof, a spring-driven motor operatively connected to said valve to effect said unidirectional movement thereof, a braking wheel rotatable by said motor, a braking member engageable with said wheel, a spring urging said braking member into engagement with said wheel, a fusible member extending into said combustion chamber, means for securing said fusible member to said braking member and to a fixed support within the combustion chamber so that said fusible member holds the braking member out of engagement wtih said wheel, and means for operating said motor.

4. A rocket engine comprising, in combination, a combustion chamber, a first conduit communicating with said chamber to admit fuel thereto; a second conduit communicating with said chamber to admit an oxidizing material thereto; a valve in at least one of said conduits, means for opening and closing said valve, a fusible member mounted within said combustion chamber and said fusible member being constructed and arranged to melt when subjected to the combustion temperature of said fuel, and means controlled by said fusible member to interrupt the operation of said means for opening and closing said valve responsive to the breakage of said fusible member caused by combustion in said chamber.

5. A rocket engine comprising, in combination, a combustion chamber; a pre-combustion chamber; a conduit communicating with said combustion chamber to admit fuel thereto; a second conduit communicating with said combustion chamber to admit oxidant thereto; a third conduit communicating with said pre-combustion chamber to admit fuel thereto; a fourth conduit communicating with said pre-combustion chamber to admit oxidant thereto; a valve in at least one of first two said conduits, a motor means operatively connected to said valve so as to open and then close said valve; a fusible member mounted within one of said combustion chambers, said fusible member being constructed and arranged to melt when subjected to the combustion temperature of said fuel and means controlled by said fusible member to interrupt the operation of said motor responsive to the breakage of said fusible member caused by combustion in said chamber.

6. The rocket engine of claim 5 wherein said valve is in the first said conduit.

7. The rocket engine of claim 5 wherein said valve is in both first and second said conduits.

8. In a rocket engine comprising, in combination, a combustion chamber, a conduit communicating with said chamber to supply an oxidant thereto, a conduit communicating with said chamber to supply fuel thereto, a valve in each of said conduits, said valves being constructed and arranged to open and then close during a unidirectional adjustment thereof, a motor operatively coupled to both valves, a fusible member in said combustion chamber being so constructed and arranged to melt when subjected to the combustion temperature of said fuel, and means controlled by said fusible member to interrupt the operation of said motor responsive to the breakage of said fusible member caused by combustion in said chamber.

References Cited in the file of this patent

UNITED STATES PATENTS

| | | |
|---|---|---|
| 1,394,807 | Blanchard | Oct. 25, 1921 |
| 1,535,240 | Morris | Apr. 28, 1925 |
| 1,630,022 | Lundquist | May 24, 1927 |
| 1,681,421 | McCabe | Aug. 21, 1928 |
| 1,879,186 | Goddard | Sept. 27, 1932 |
| 2,402,826 | Lubbock | June 25, 1946 |
| 2,408,111 | Truax et al. | Sept. 24, 1946 |
| 2,528,134 | Goddard | Oct. 31, 1950 |
| 2,538,642 | Gardiner et al. | Jan. 16, 1951 |
| 2,575,070 | Reed et al. | Nov. 13, 1951 |
| 2,643,511 | Briggs | June 30, 1953 |